United States Patent [19]

Tanaka

[11] Patent Number: 5,067,227
[45] Date of Patent: Nov. 26, 1991

[54] DOUBLE WRAP BRAKE BAND AND ITS MANUFACTURING METHOD

[75] Inventor: Teruhiko Tanaka, Osaka, Japan

[73] Assignee: Kabushiki Kaisha Daikin Seisakusho, Osaka, Japan

[21] Appl. No.: 590,867

[22] Filed: Oct. 1, 1990

Related U.S. Application Data

[62] Division of Ser. No. 402,411, Sep. 5, 1989, Pat. No. 5,012,905.

[30] Foreign Application Priority Data

Sep. 12, 1988 [JP] Japan .................. 63-227680

[51] Int. Cl.⁵ .............................................. B23P 21/00
[52] U.S. Cl. .................................... 29/469; 29/447;
29/469.5; 29/525.2
[58] Field of Search .............. 29/412, 413, 434, 445,
29/446, 447, 469, 469.5, 521, 525.2

[56] References Cited

U.S. PATENT DOCUMENTS

| | | | |
|---|---|---|---|
| 1,456,606 | 5/1923 | Konigslow, Sr. ................. | 188/77 R |
| 2,867,898 | 1/1959 | Vosler et al. .......................... | 29/416 |
| 4,602,706 | 7/1986 | Blinks et al. .......................... | 29/418 |
| 4,757,880 | 7/1988 | Gyesiak ............................ | 188/77 W |

Primary Examiner—P. W. Echols
Assistant Examiner—David P. Bryant
Attorney, Agent, or Firm—Armstrong, Nikaido, Marmelstein, Kubovcik & Murray

[57] ABSTRACT

A method of manufacturing a double wrap brake band having three bands, friction facings fastened to each band, and a connecting member connecting outside bands of the three bands with an intermediate band of such bands. A first bracket member is secured to both outside bands, and a second bracket member secured to the intermediate band. The three bands, the connecting member, and the first and second bracket members are all made of sheet metal. Edges, receiving a piston, or an anchor, at their backsides, are integrally formed on the first and second bracket members. The connecting member and the first and second bracket members are secured to the three bands by rivets. The second bracket member is provided with wing-shaped reinforcing members which stretch integrally from both sides of a portion secured to the intermediate band at the backside of the edge toward a lateral direction of both outside bands to cover both outside bands, and extend integrally in a circumferential direction to both front side protions of the edge.

3 Claims, 7 Drawing Sheets

DOUBLE WRAP BRAKE BAND AND ITS MANUFACTURING METHOD

This is a division of application Ser. No. 402,411 filed Sept. 5, 1989, now U.S. Pat. No. 5,012,905.

BACKGROUND OF THE INVENTION

1. Field of the Invention

This invention relates to a double wrap brake band and its manufacturing method for use in an automatic transmission for an automobile.

2. Description of the Related Art

Figure 17:
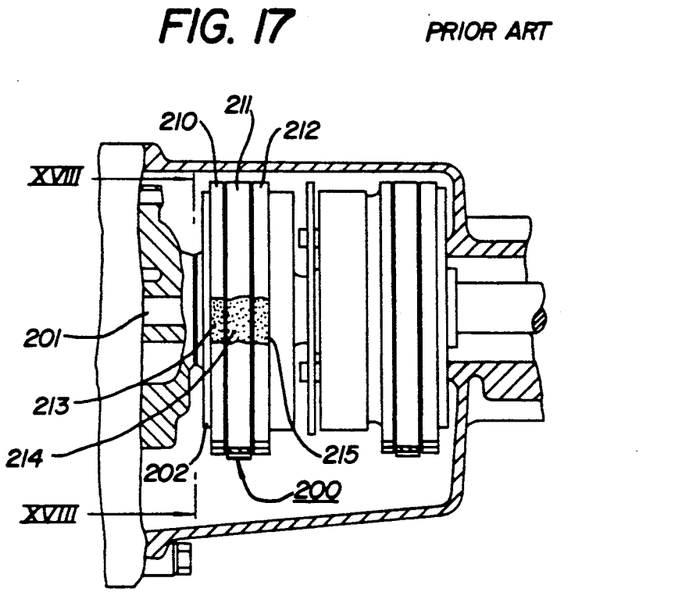
FIG. 17 is a vertical sectional schematic view of a general automatic transmission.
Figure 18:
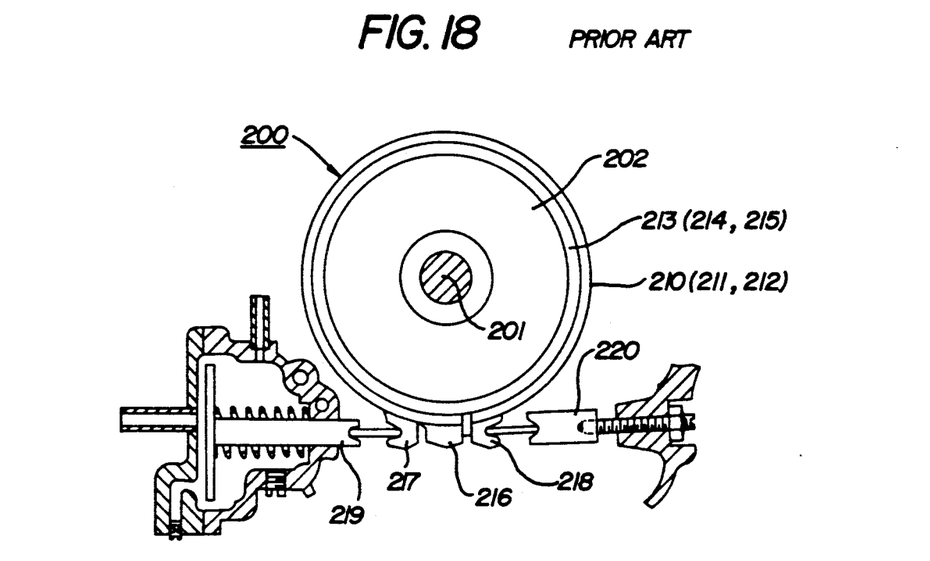
FIG. 18 is a sectional view taken along line XVIII—XVIII of FIG. 17.

Generally, a construction shown by 200 in FIG. 17 and FIG. 18, for example, has been known as a double wrap brake band for use in an automatic transmission (U.S. Pat. No. 2,867,898). In this structure, the brake band 200 is disposed on an outer peripheral part of a drum 202 concentric with a drive shaft 201 extending from a torque converter not shown.

The double wrap brake band 200 is provided with three bands 210, 211 and 212 formed approximately into annular shape, and friction facings 213, 214 and 215 fastened to the inner peripheral surfaces of the bands 210, 211 and 212. A connecting member 216 connects the circumferential ends of the outside bands 210 and 212 with another circumferential end of the intermediate band 211. A first bracket member 217 is secured to the circumferential ends of the outside bands 210 and 212. A second bracket member 218 is secured to one circumferential end of the intermediate band 211. The first bracket member 217 has an edge for receiving a piston 219 and the second bracket member 218 has an edge for receiving an anchor pin 220.

In the structure shown in FIG. 17 and FIG. 18, the connecting member 216 and the first and second bracket members 217 and 218 are all made of forging segments which are welded to the thick metal straps and then formed into prescribed shapes by broaching. Internal stresses are produced during manufacturing and cause drags between the completed bands 210, 211 and 212 and a drum 202.

To solve the above-mentioned troubles, a structure and its manufacturing method, wherein the connecting member and the first and second bracket members are integrally made of sheet metal and welded to straps made of sheet metal, have been proposed in U.S. patent application Ser. No. 310,340 and have been disclosed in Japan (Japanese Patent Publication No. 58-68523).

However, this structure is apt to distort by heat during manufacturing because the connecting member and the first and the second bracket members are welded to the bands. Further, even the narrow second bracket member, which is secured to the intermediate band, is made of thin sheet metal, so that sufficient strength is not obtainable.

Furthermore, because this structure includes the process in which the connecting member and the first and second bracket members are manufactured from a unit segment, it is difficult to change thicknesses and materials of respective components.

An object of this invention is to solve the above-mentioned troubles.

SUMMARY OF THE INVENTION

In order to solve the above-mentioned troubles, this invention provides a double wrap brake band including three bands formed into approximately annular shape, friction facings fastened to inner peripheral surfaces of respective bands, a connecting member circumferentially connecting one end of both outside bands with an end of an intermediate band, a first bracket member secured to the other circumferential ends of outside bands, and a second bracket member secured to a circumferential end of the intermediate band; characterized by that the three bands, the connecting member, and the first and second bracket members are separately made of sheet metal, an edge receiving a piston or an anchor at backsides is integrally formed on the first and second bracket members, respectively, the connecting member and the first and second bracket members are secured to corresponding places of the three bands by means of rivets, respectively, and the second bracket member is provided with wing-shaped reinforcing members which stretch integrally from both sides of a portion secured to the intermediate band at the backside of the edge toward a lateral direction of both outside bands to cover both outside bands, and extend integrally in a circumferential direction to the both front side portions of the edge.

Further, this invention also provides a manufacturing method of a double wrap brake band which includes a process for forming a strap made of sheet metal into annular shape, provided with rivet holes for securing the two bracket members and slit groups in two parallel rows extending intermittently in a longitudinal direction; a process for forming a strap-like friction facing, of which the strap is formed into approximately circular shape by means of heat treatment, and the strap-like friction facing previously provided with slit groups in two rows extending intermittently in the longitudinal direction is fastened to the inner peripheral surface of the strap; a process for forming three bands by aligning the slit groups on the strap to which the friction facing is fastened; a process for forming a connecting member connecting circumferential one end portions which become both outside bands of the strap with a circumferential other end portion which becomes the intermediate band, a first bracket member secured to circumferential other end portions which become the both outside bands, and a second bracket member secured to a circumferential one end portion which becomes an intermediate band, made of sheet metal respectively; and a process for securing the connecting member and an first and second bracket members to respective corresponding places of the strap by using rivets; the process for forming the first and second bracket members including a process for forming an edge which receives a piston or an anchor pin at their backsides by bending approximately middle portions thereof; and the process for forming the second bracket member including a process for forming wing-shaped reinforcing members which stretch integrally from both sides of a portion secured to the intermediate band at the backside of an edge toward a lateral direction of both outside bands to cover both outside bands, and extend integrally in a circumferential direction to both front side portions of the edge.

DESCRIPTION OF THE PREFERRED EMBODIMENTS

Figure 1:
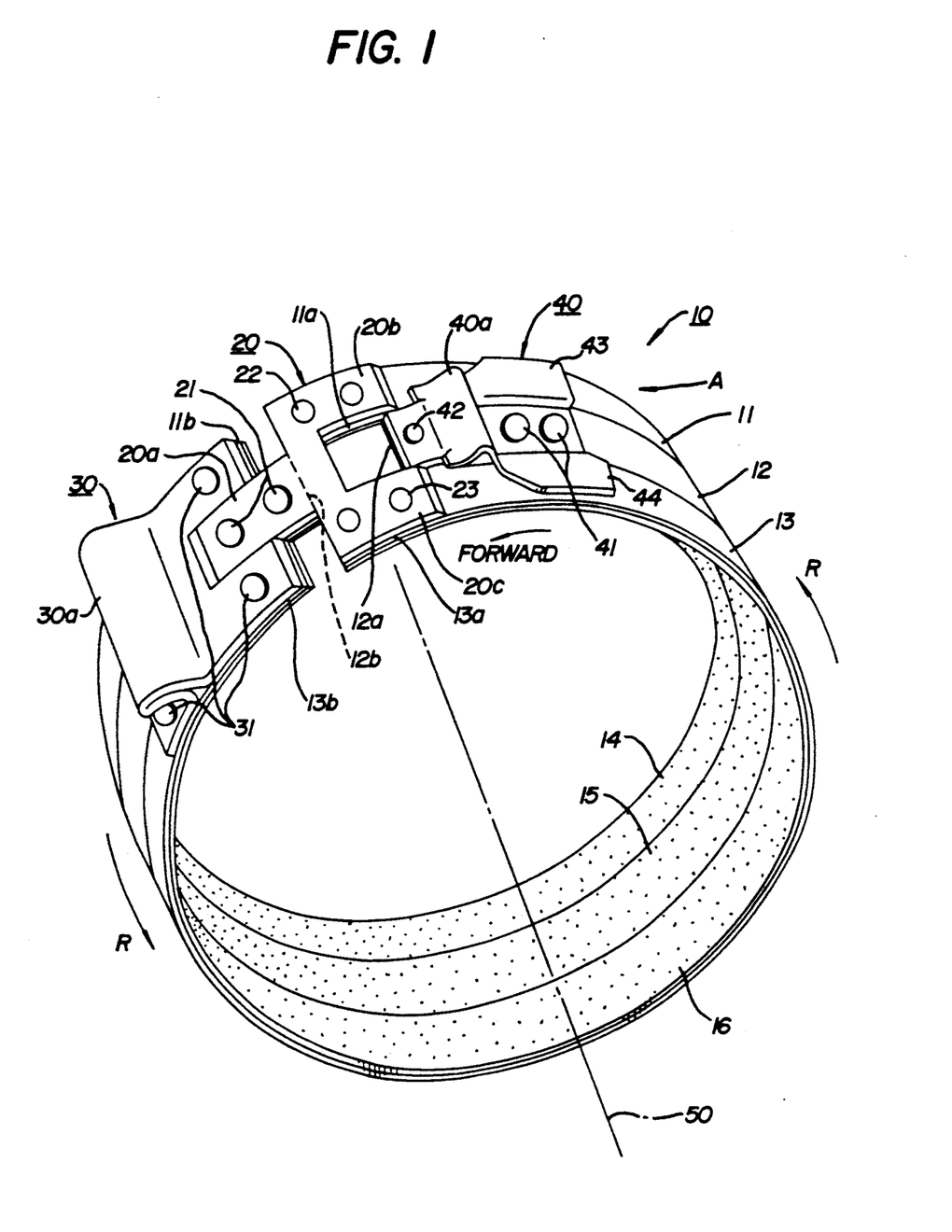
FIG. 1 is an perspective view of the double wrap brake band according to this invention.

As illustrated in FIG. 1, a double wrap brake band 10, according to the present invention, includes three bands 11, 12 and 13 formed into a C-shape. The outside bands 11 and 13 are disposed in a manner so that circumferential ends 11a and 13a are aligned with each other and circumferential ends 11b and 13b. An intermediate band 12 is disposed so that one end 12a fits between outside bands 11 and 13 and extends in a circumferential direction. The other end 12b of intermediate band 22 projects from between bands 11 and 13 in the circumferential direction. The bands 11, 12 and 13 are made of the thin sheet metal having a uniform thickness. Although widths of the outside bands 11 and 13 are substantially the same, the width of the intermediate band 12 is larger than outside bands 11 and 13.

Friction facings 14, 15 and 16 are integrally fastened to the inner peripheral surfaces of bands 11, 12 and 13, respectively.

20 is a connecting member, being approximately Y-shaped, connecting portions 20b and 20c extend integrally from connecting portion 20a, connecting portions 20b and 20c are parallel with each other and extend in the opposite direction to connecting portion 20a. The other end 12b of the intermediate band 12 is secured to an internal face of the connecting portion 20a of the connecting member 20 by caulking rivets 21. The one ends 11a and 13a of outside bands 11 and 13 are secured to internal faces of the connecting portions 20b and 20c by caulking rivets 22 and 23. Connecting member 20 is also made of sheet metal. When connecting member 20 is made of sheet metal having larger flexibility than that of first and second bracket members 30 and 40 described later, bands 11, 12 and 13 can hold a drum 50 (only its center line being shown) in FIG. 1 and more uniformly and effectively prevent improper fastening or drag. Because the connecting member 20 in the present invention is formed separately from first and second bracket members 30 and 40, described later, it becomes possible to modify material and shape on one member only for instance, only connecting member 20.

Figure 8:
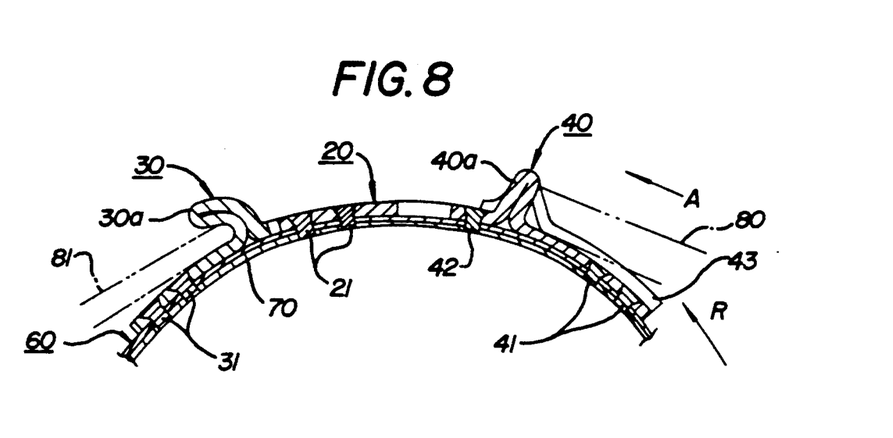
FIG. 8 is a sectional view taken along line VIII—VIII of FIG. 6.

First bracket member 30 is secured to ends 11b and 13b of the outside bands 11 and 13 by caulking rivets 31. The first bracket member 30 is formed by a process, in which sheet metal is punched into approximately H-shape and its middle portion is bent upward to integrally configure an edge 30a for receiving an anchor pin 81 (FIG. 8).

The second bracket member 40 is secured to an upper part of one end 12a of intermediate band 12. Bracket member 40 is also bent upward at a part slightly deviated from its middle portion to the connecting member 20 side so as to form an edge 40a for receiving a piston 80 (FIG. 8). Assuming that the connecting member 20 side of the bracket member 40 is a front side, a rear side of edge 40a is secured to intermediate band 12 by caulking two rivets 41 arranged in the circumferential direction of the intermediate band 12, and a front side of the edge 40a is secured to one end 12a of intermediate band 12 by caulking rivet 42. As illustrated by the figure, the bracket member 40 is provided with wing-shaped reinforcing members 43 and 44 which stretch integrally from both sides of a portion secured to intermediate band 12 at the backside of edge 40a toward a lateral direction of both outside bands 11 and 13 to cover upper portions of both outside bands 11 and 13 with some clearance. These reinforcing members 43 and 44 are stretched and curved in the circumferential direction along with annular bands 11, 12 and 13. Their tip ends are formed integrally on the front side of edge 40a and bent upward. Because reinforcing members 43 and 44 increase the strength in the circumferential direction of edge 40a, a sufficient durability can be obtained even when thin sheet metal is applied for the material of second bracket 40. Further, because reinforcing members 43 and 44, formed into wing shape, are stretched in the lateral direction of outside bands 11 and 13 as to cover upper portions of the outside bands 11 and 13, with clearance, members 43, 44 also provide a non-skid function for piston 80.

When first and second bracket members 30 and 40 are fabricated, they are formed into suitable annular shape to fit outer peripheral surfaces of bands 11, 12 and 13.

Manufacturing of the present invention will be described hereunder.

Figure 2:
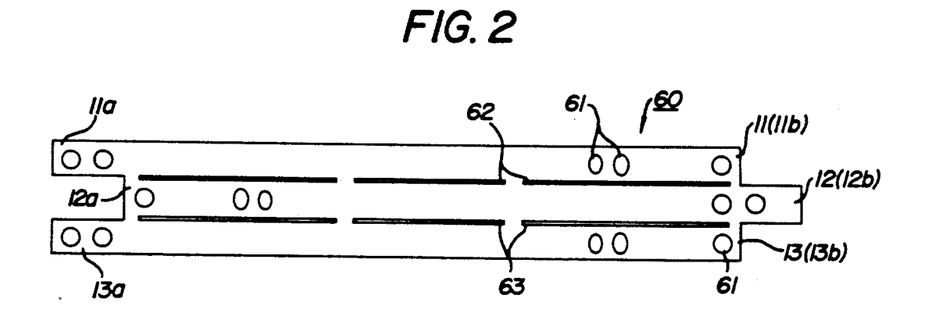
FIG. 2 is a plan view of a strap to which this invention is applicable.

The bands 11, 12 and 13 as described in FIG. 1 are made from a strap 60 illustrated in FIG. 2. Strap 60 is formed by punching sheet metal in a press, for example. In the embodiment of FIG. 2, portions which become ends 11a and 13a of bands 11 and 13 project slightly from a portion which becomes intermediate band 12, so that a portion which becomes the other end 12b of intermediate band 12 projects slightly from portions which become outside bands 11 and 13.

Rivet holes 61 and slits 62 and 63 are formed in strap 60 by simultaneously punching the sheet metal.

Rivet holes 61 secure first and second bracket members 30 and 40 (FIG. 1). Simultaneous formation of rivet holes 61 permits easy positioning for attaching first and second bracket members 30 and 40 without a special gauge or jig.

Slits 62 and 63 (slit groups) extend intermittently in two parallel rows, dividing strap 60 into three pieces, to form the three bands 11, 12 and 13 (FIG. 1), by joining slits 62 and 63 in their longitudinal direction, respectively. If slits 62 and 63 are formed in such a manner that both end portions which become bands 11, 12 and 13 are joined to each other in their lateral direction, forming, described later, will become easy.

Figure 3:
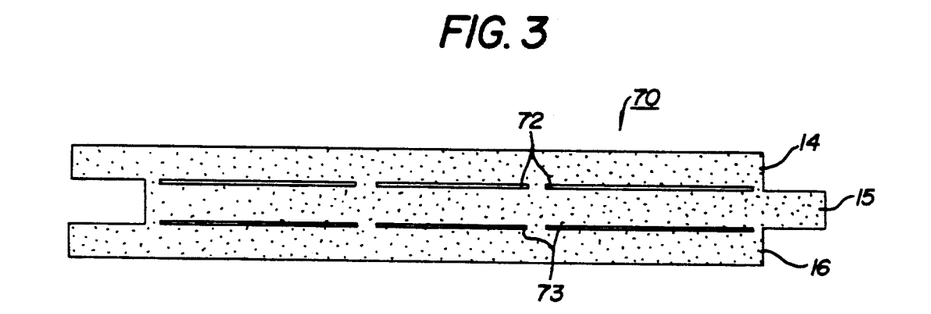
FIG. 3 is a plan view of a friction material to which this invention is applicable.

FIG. 3 shows a friction material having the same dimension and configuration as the strap 60 of FIG. 2. However, holes corresponding to rivet holes 61 of FIG. 2 are not formed in the friction material 70. Slits 72 and 73, arranged in two parallel rows, (slit group) are formed in the friction material 70 in the same way as strap 60 of FIG. 2. Three friction facings 14, 15 and 16 (FIG. 1) can be formed by joining these slits 72 and 73 in their longitudinal direction.

Figure 4:
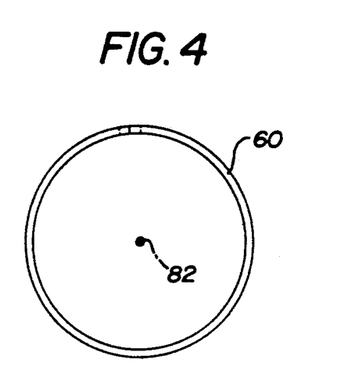
FIG. 4 is a schematic side view of a strap according to this invention.

FIG. 4 shows a process for forming strap 60 of FIG. 2 into annular shape by winding strap 60 around core metal 82.

Figure 5:
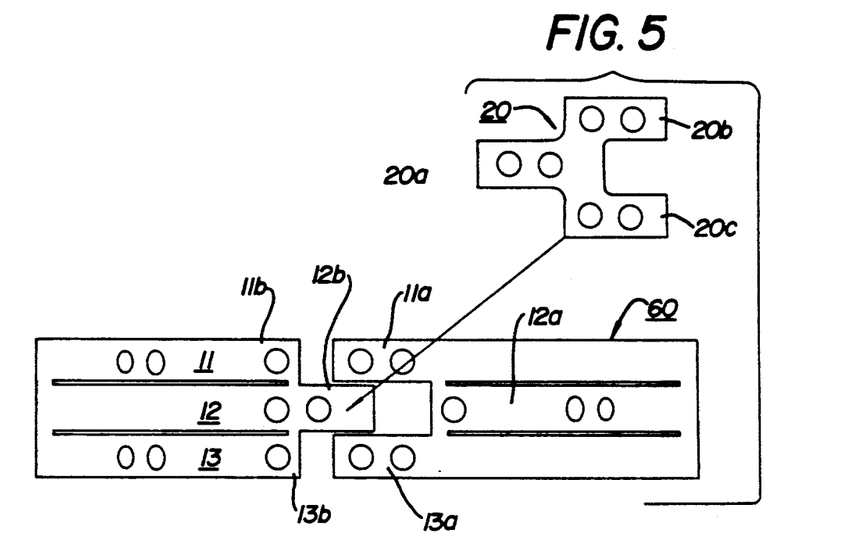
FIG. 5 is a plan view showing a connection of the strap according to this invention.

Strap 60 is formed into annular shape in the process of FIG. 4 as illustrated in FIG. 5. In this process, the portion of strap 60 corresponding to end 12b of intermediate band 12 goes in between portions corresponding to ends 11a and 13a of outside bands 11 and 13. The portion of strap 60 corresponding to one end 12a of intermediate band 12 is spaced, with a small clearance in the circumferential direction, apart from the portion corresponding to other end 12b.

Connecting member 20, illustrated in an upper part of FIG. 5, is secured by caulking the rivets 21, 22 and 23 (FIG. 1) so that the portions which become ends 11a and 13a of the outside bands 11 and 13 of strap 60 and the portion which becomes end 12b of intermediate band 12 of strap 60 are connected with each other.

Figure 6:
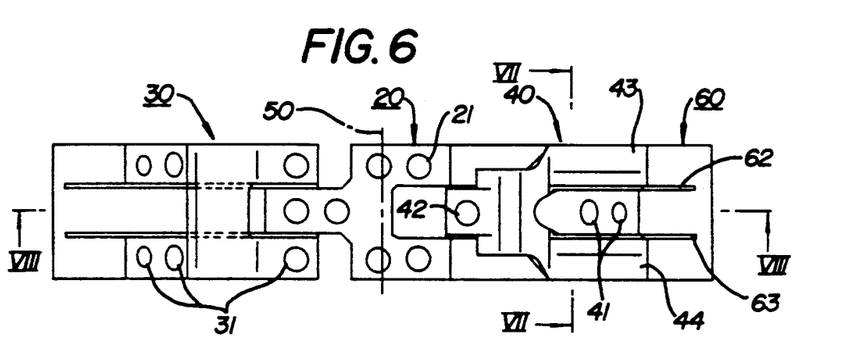
FIG. 6 is a plan view of the strap showing a bracket member secured according to this invention.
Figure 7:
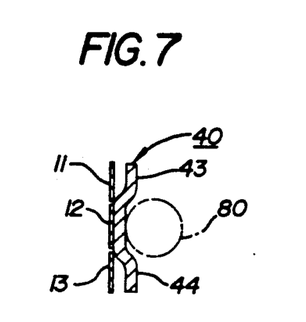
FIG. 7 is a sectional view taken along line VII—VII of FIG. 6.

As illustrated in FIG. 6 and FIG. 7, first and second bracket members 30 and 40, made of sheet metal, are preformed by a press and are secured by caulking rivets 31, 41 and 42 to strap 60, connected by connecting member 20 and formed into annular shape. After the connecting process of the first and second bracket members 30 and 40, the assembly, consisting of strap 60, connecting member 20 and first and second bracket members 30 and 40, is formed into a perfect circle fitting onto drum 50 (only its center line being shown in FIG. 6). Reinforcing members 43 and 44, described in details in FIG. 1, are formed integrally with second bracket member 40 by the press, as shown by FIG. 7, and reinforce second bracket member 40 and work as a guide member for piston 80.

After heat treatment of the assembly, consisting of strap 60, connecting member 20 and first and second bracket members 30 and 40, friction material 70, FIG. 3, is fastened to the inner peripheral surface of strap 60 as illustrated in FIG. 8. 81 in FIG. 8 is an anchor pin.

Figure 9:
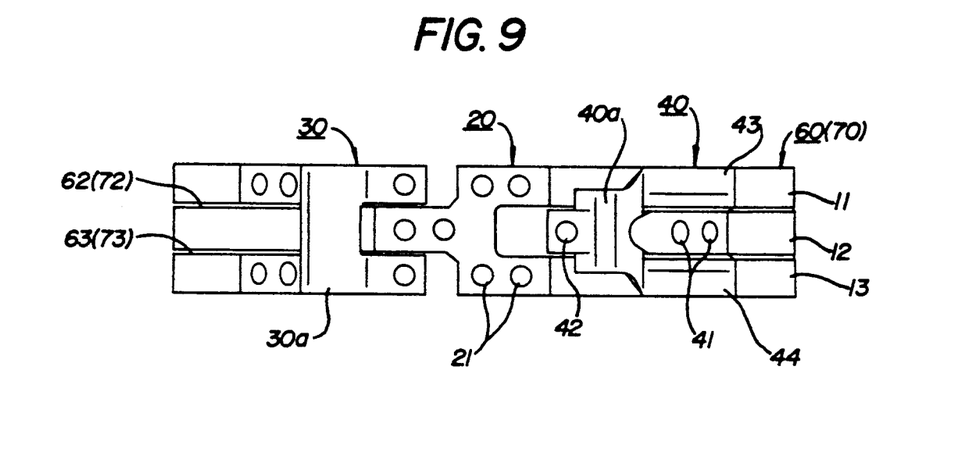
FIG. 9 is a plan view showing the cutting of the strap according to this invention.

Finally, slits 62, 63, 72 and 73 (FIG. 2 and FIG. 3) of strap 60 and friction material 70 are joined together in the circumferential direction by using an appropriate tool such as a cutter, so that strap 60 and friction material 70 are divided into separated pieces as illustrated by FIG. 9. Thereby, the double wrap brake band 10 of the present invention shown in FIG. 1 is completed.

Function

When piston 80 (FIG. 8) pushes edge 40a of second bracket member 40 in a direction of arrow A under the condition that the drum 50 is released, as shown in FIG. 1, intermediate band 12 transmits force in a direction of arrow R through second bracket member 40. The force of the intermediate band 12 is transmitted through connecting member 20 to outside bands 11 and 13, so that the force in the direction of arrow R is transmitted to first bracket member 30. The first bracket member 30 tends to move in the direction of arrow R. However, because the movement of first bracket member 30 is prevented by anchor pin 81 (FIG. 8), each of bands 11, 12 and 13 tightens drum 50, uniformly contacting with the outer peripheral surface of drum 50. Thus, a friction force is produced between the outer peripheral surface of drum 50 and inner peripheral surfaces of bands 11, 12 and 13. The rotation of drum 50 is braked by the friction force.

Although edge 40a of second bracket member 40 receives strong pressing force of piston 80 (FIG. 8) during the operation, reinforcing members 43 and 44, integrally formed at the rear of the edge 40a, enable edge 40a to fully withstand the driving force. Accordingly, second bracket member 40 does not deform even when double wrap brake band 10 of the present invention is used under severe operating conditions. Further, there is no possibility that piston 80 (FIG. 8) will slide in the lateral direction of bands 11, 12 and 13, because reinforcing members 43 and 44 stretch in the lateral direction of both outside bands 11 and 13 formed into wing shape as to cover the upper portions of both outside bands 11 and 13 with clearance. If connecting member 20 is made of sheet metal having large flexibility, bands 11, 12 and 13 fit onto the outer peripheral surface of drum 50 preventing improper fastening, and stabilizing a friction coefficient therebetween.

Although first bracket member 30 is set up for anchor pin 81 and the second bracket member 40 is set up for piston 80 according to the above embodiment, it is possible to apply first bracket member 30 for piston 80 and to apply second bracket member 40 for anchor pin 81.

According to the present invention as described above; bands 11, 12 and 13, connecting member 20 and first and second bracket members 30 and 40 are made of sheet metal, so that it becomes possible to obtain cheap products and to reduce weight of the products as compared with conventional members made of spring metal for example.

Further, connecting member 20 and first and second bracket members 30 and 40 are secured to corresponding places of bands 11, 12 and 13 by rivets 21, 22, 23, 31, 41 and 42, so that the present invention provides easy positioning without a special gauge or jig to secure the members. Consequently, efficiency of assembly operations can be raised. Reliability can be improved as compared with welding, and there is no fear of occurrence of residual strain as frequently encountered in welding. Therefore, the present invention enables to provide products with less drag and stable friction coefficient.

The second bracket member 40, secured to the intermediate band 12 of the present invention, is provided with wing-shaped reinforcing members 43 and 44 which stretch integrally from both sides of the portion secured to intermediate band 12 at the backside of edge 40a toward the lateral direction of outside bands 11 and 13, and extend integrally in a circumferential direction. Therefore, bracket member 40 is stronger than a conventional bracket. Particulally, sufficient durability can be obtained even if thin sheet metal is applied for narrow second bracket member 40 secured to intermediate band 12. Accordingly, bracket member 40 does not deform even if the double wrap brake band 10 is used under severe operating conditions.

Furthermore, because the manufacturing method of the present invention includes the process for forming connecting member 20 and first and second bracket members 30 and 40 separately from each other, modification of material and shape etc. on only one member (for example, the connecting member 20) becomes possible. Therefore, for example when only connecting member 20 is made of highly flexible sheet metal, as in the embodiment described in FIG. 1 through FIG. 9, it becomes possible to make bands 11, 12 and 13 fit onto the outer peripheral surface of drum 50, preventing improper fastening, and stabilizing the friction coefficient therebetween.

In the embodiment illustrated in FIG. 10 through FIG. 16, structure and manufacturing for modified shapes of connecting member 20, strap 60 and friction material 70 described in FIG. 1 through FIG. 9 are disclosed.

Figure 10:
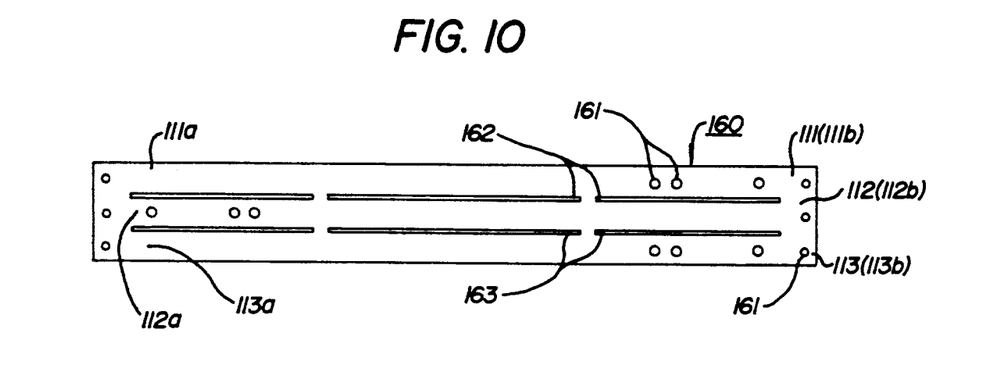
FIG. 10 is a plan view of an another strap to which this invention is applicable.

As shown in FIG. 10, a rectangular strap 160 may be employed in the present invention, in which parts which become bands 111, 112 and 113 are aligned flush with each other and formed into strap-like shape. The rivet holes 161 and slits 162 and 163 are punched on strap 160 in the same way as strap 60 (FIG. 2).

Figure 11:
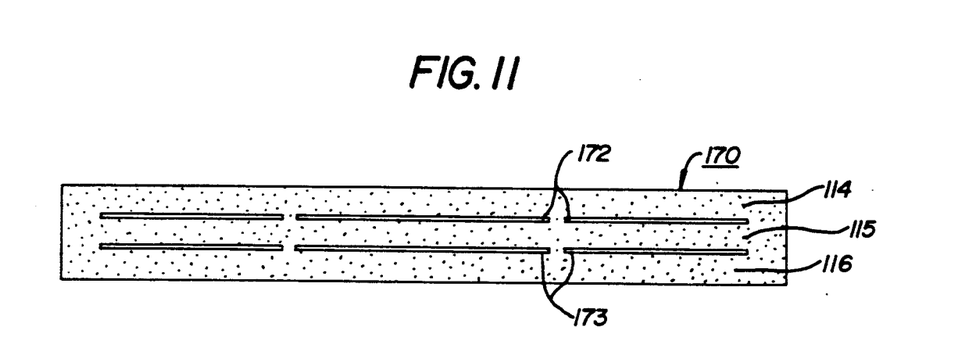
FIG. 11 is a plan view of an another friction material to which this invention is applicable.

A friction material 170, having the same dimension and shape as strap 160 is shown in FIG. 11 of which slits 172 and 173 are punched in the same way as friction material 70 of FIG. 3.

Figure 12:
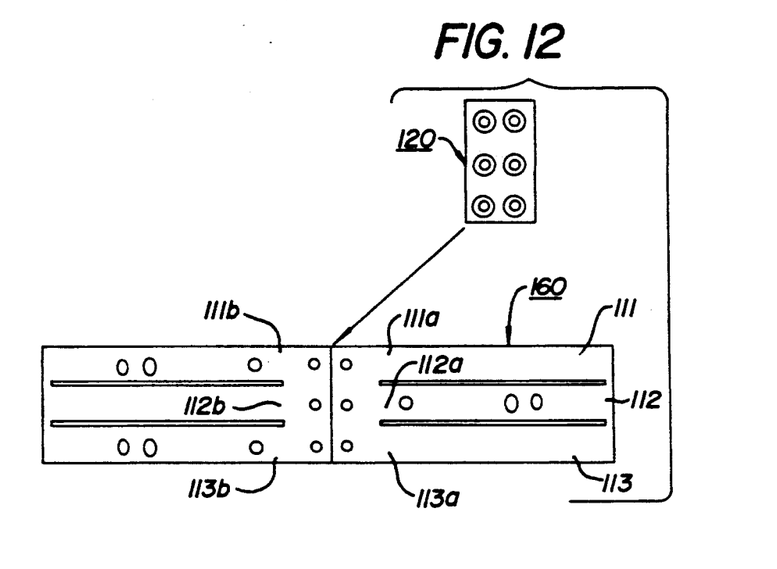
FIG. 12 is a plan view showing the connection of the strap of FIG. 10.
Figure 16:
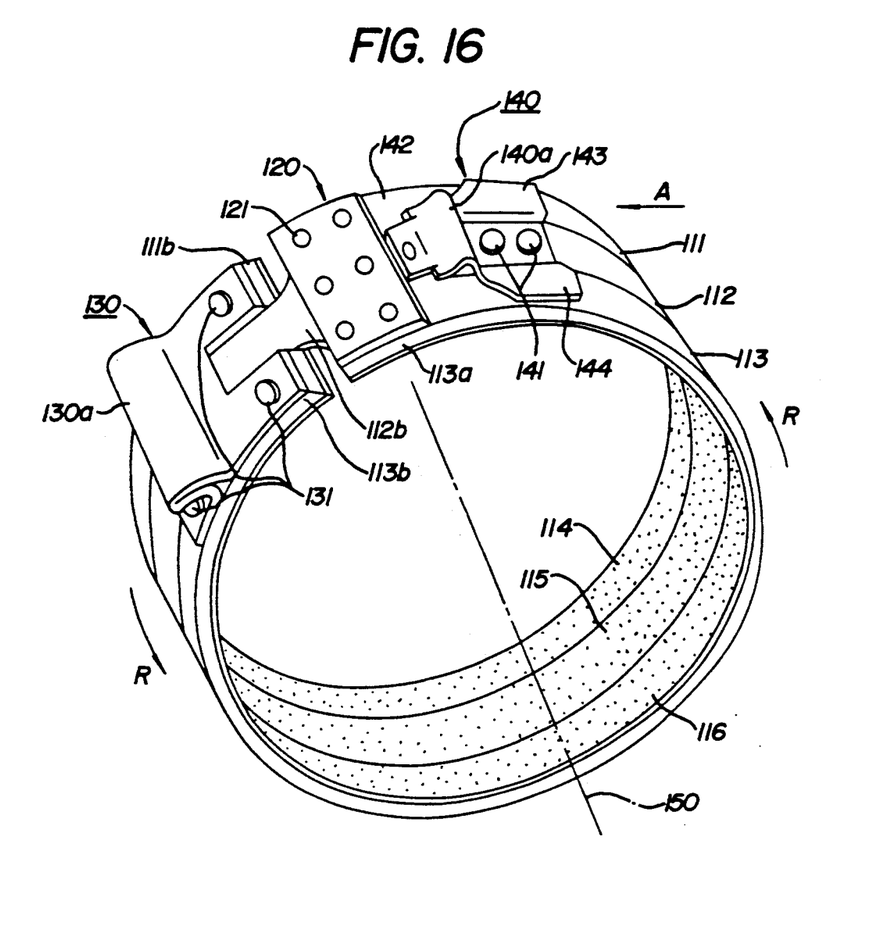
FIG. 16 is an perspective view of the double wrap band described in FIG. 10 through FIG. 15.

In a process shown in FIG. 12, the strap 160 is formed into annular shape by connecting a connecting member 120 by means of rivets 121 (FIG. 16). Strap 160 is so curved that its circumferential both end faces abut on each other. As illustrated by an upper part of FIG. 12, the connecting member 120 is a rectangular member one side of which has the same width of strap 160, and is longer than the other side. Parts which become ends 111a, 112a and 113a of the bands 111, 112 and 113 of the strap 160 are respectively connected to parts which become the other ends 111b, 112b and 113b by caulking three pairs of rivets 121 (FIG. 16), lining up in a lateral direction of the strap 160, by which the connecting member 120 is secured.

Figure 13:
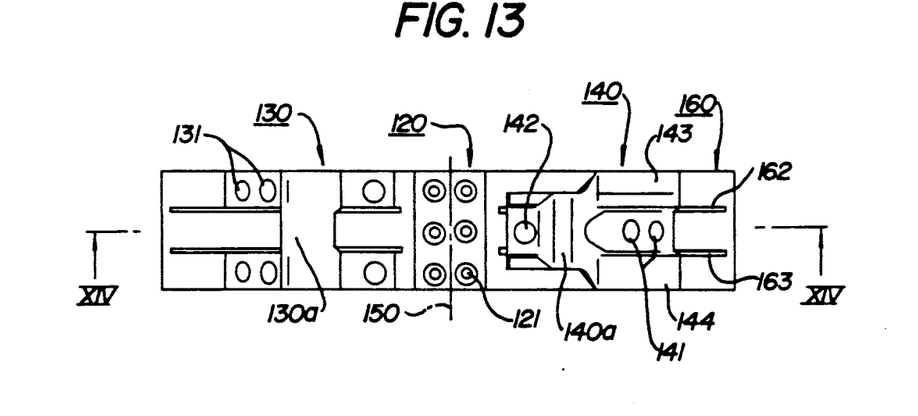
FIG. 13 is a plan view showing the securing of the bracket member according to this invention.

As illustrated in FIG. 13, the first and second bracket members 130 and 140, made of sheet metal and preformed by the press, are respectively secured by rivets 131, 141 and 142 to the strap 160 which has been formed into annular shape by securing the connecting member 120. A heat treatment of an assembly, consisting of the strap 160, the connecting member 120 and the first and second bracket members 130 and 140, is carried out to form the assembly into a perfect circle fitting onto drum 150 (only its center line being shown in FIG. 6). The first and second bracket members 130 and 140 correspond to first and second bracket members 30 and 40 shown in FIG. 1, respectively.

Figure 14:
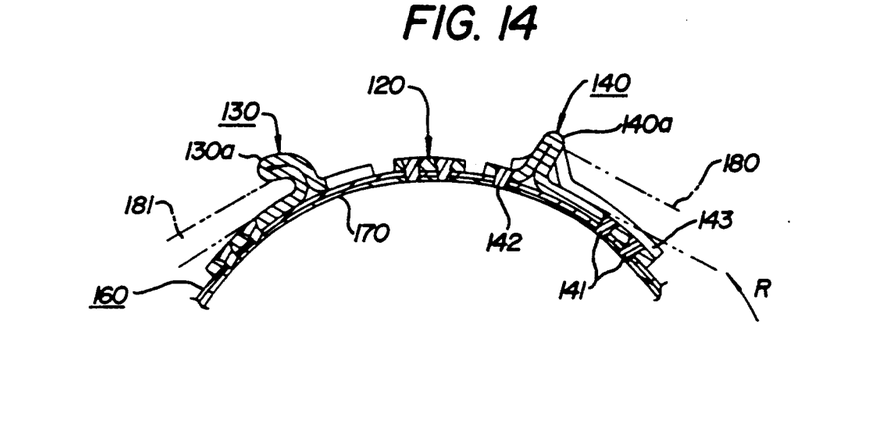
FIG. 14 is a sectional view taken along line XIV—XIV of FIG. 13.

As illustrated in FIG. 14, after heat treatment of the assembly consisting of strap 160, connecting member 120 and first and second bracket members 130 and 140, friction material 170 of FIG. 11 is fastened to the inner peripheral surface of strap 160.

Figure 15:
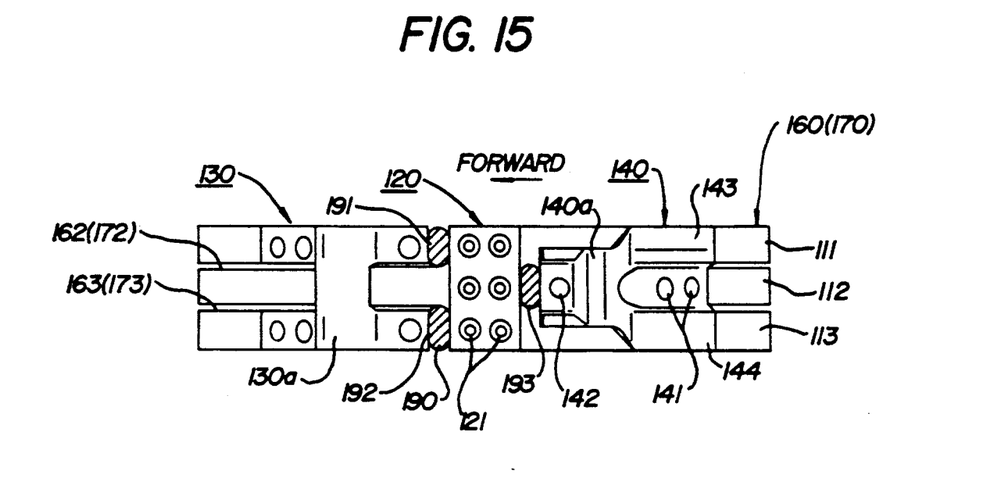
FIG. 15 is a plan view of the strap according to this invention.

Then, notches 191, 192 and 193 are formed in the assembly consisting of strap 160, connecting member 120 and first and second bracket members 130 and 140 by using a press 190, for example, as illustrated in FIG. 15. The notches 191, 192 and 193 divide strap 160, to which friction material 170 is fastened, into three pieces. Assuming that a left side of FIG. 15 is a front side, strap 160 is divided into two outside adjacent portions at the front of connecting member 120 and a central adjacent portion at the rear of connecting member 120, for example. Strap 160, to which friction material 170 is fastened, is divided in the same way as shown in FIG. 9 by joining slits 162, 163, 172 and 173 in the circumferential direction, thereby a double wrap brake band 110, shown in FIG. 16, is completed.

What is claimed is:

1. A method for manufacturing a double wrap brake band comprising the steps of forming a sheet metal strap having rivet holes at the opposite ends thereof for securing brackets thereto and slit groups in two parallel rows extending intermittently in a longitudinal direction of said strap into a substantially perfect annular shape by bending said strap; fastening a band-shaped friction facing having extending groups of slits corresponding in length and number to said slits in said metal strap to the inner annular surface of said strap, said slits in said strap and friction facing dividing said strap, with said friction facing thereon, into three annular bands, one band at each of the opposite outer side portions of said annular shaped strap outwardly of said two parallel rows of slits and one intermediate annular band intermediate said two parallel rows and outer bands, said two outer bands and said intermediate band each having said rivet holes at the opposite ends thereof; forming first and second sheet metal brackets having outwardly extending edge portions, said edge portion of one of said brackets being formed for receiving a piston and said edge portion of the other of said brackets being formed for receiving an anchor pin connected to said piston, said first and second sheet metal brackets having rivet holes extending therethrough for alignment with said rivet holes on said outer bands and said intermediate band, respectively, one of said sheet metal brackets for riveting to said intermediate band having wing-shaped reinforcing members extending outwardly from opposite sides of said one bracket for covering portions of said outside bands when the other of said brackets is secured to said outside bands and said one bracket is secured to said intermediate band; and securing said one of said brackets to said intermediate band and said other of said brackets to said outside bands by inserting rivets in said rivet holes in said one bracket and said intermediate band and through said rivet holes in said other of said brackets and said outer bands and caulking said rivets in said holes.

2. A method for manufacturing a double wrap brake band as set forth in claim 1, in which said rivet holes in said metal strap and said sheet metal brackets are simultaneously punched.

3. A method for manufacturing a double wrap brake band as set forth in claim 1 or claim 2, in which said first and second sheet metal brackets are formed into annular shape to fit said annular shape of said strap before said brackets are riveted to said outer and intermediate bands.

* * * * *